(12) United States Patent
Ueki et al.

(10) Patent No.: US 10,777,799 B2
(45) Date of Patent: Sep. 15, 2020

(54) NON-AQUEOUS ELECTROLYTE SECONDARY BATTERY

(75) Inventors: Tomoyoshi Ueki, Toyota (JP); Naoyuki Wada, Osaka (JP); Yoshiyuki Ozaki, Neyagawa (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 225 days.

(21) Appl. No.: 13/989,428

(22) PCT Filed: Nov. 26, 2010

(86) PCT No.: PCT/JP2010/071179
§ 371 (c)(1),
(2), (4) Date: May 24, 2013

(87) PCT Pub. No.: WO2012/070154
PCT Pub. Date: May 31, 2012

(65) Prior Publication Data
US 2013/0252056 A1      Sep. 26, 2013

(51) Int. Cl.
*H01M 2/16*        (2006.01)
*H01M 10/052*   (2010.01)
*H01M 10/0587* (2010.01)

(52) U.S. Cl.
CPC ......... *H01M 2/1686* (2013.01); *H01M 2/166* (2013.01); *H01M 2/1653* (2013.01);
(Continued)

(58) Field of Classification Search
CPC ........ H01M 2/14; H01M 2/16; H01M 2/1606; H01M 2/1613; H01M 2/162; H01M 2/164;
(Continued)

(56) References Cited

U.S. PATENT DOCUMENTS

2002/0055036 A1   5/2002  Shinohara et al.
2003/0190523 A1   10/2003 Omaru et al.
(Continued)

FOREIGN PATENT DOCUMENTS

CN    1340868    3/2002
CN    1965426    5/2007
(Continued)

*Primary Examiner* — Cynthia K Walls
(74) *Attorney, Agent, or Firm* — Finnegan, Henderson, Farabow, Garrett & Dunner, LLP

(57) ABSTRACT

The present invention provides an optimal non-aqueous electrolyte secondary battery having high durability against high rate charging and discharging and excellent safety. The non-aqueous electrolyte secondary battery 100 according to the present invention comprises a positive electrode 10, a negative electrode 20 and a separator 30 which is interposed between the positive electrode 10 and the negative electrode 20. The separator 30 has a two-layer structure which is composed of a porous polyethylene layer 34 mainly composed of polyethylene, and a porous polymer layer 32 mainly composed of a polymer having higher oxidation resistance than that of the polyethylene, and an inorganic filler layer 40 including an inorganic filler and a binder is formed on the surface of the polyethylene layer 34 on which the porous polymer layer 32 is not formed.

7 Claims, 4 Drawing Sheets

(52) U.S. Cl.
CPC ...... *H01M 10/052* (2013.01); *H01M 10/0587* (2013.01); *Y02T 10/7011* (2013.01)

(58) Field of Classification Search
CPC . H01M 2/1646; H01M 2/1653; H01M 2/1686
See application file for complete search history.

(56) References Cited

U.S. PATENT DOCUMENTS

| | | |
|---|---|---|
| 2005/0221172 A1* | 10/2005 | Kato et al. .................... 429/144 |
| 2007/0178384 A1 | 8/2007 | Kajita et al. |
| 2009/0067119 A1 | 3/2009 | Katayama et al. |
| 2009/0246641 A1 | 10/2009 | Deguchi et al. |
| 2009/0291355 A1 | 11/2009 | Baba et al. |
| 2011/0206977 A1 | 8/2011 | Ikeda |
| 2012/0100411 A1 | 4/2012 | Umehara |

FOREIGN PATENT DOCUMENTS

| | | |
|---|---|---|
| CN | 101371396 A | 2/2009 |
| CN | 100472847 C | 3/2009 |
| JP | 2003-243033 | 8/2003 |
| JP | 2006-164873 | 6/2006 |
| JP | 2007-123238 | 5/2007 |
| JP | 2007-157459 | 6/2007 |
| JP | 2007-188777 | 7/2007 |
| JP | 2008-123988 | 5/2008 |
| JP | 2008-305662 | 12/2008 |
| JP | 2008-305783 | 12/2008 |
| JP | 2010-240936 | 10/2010 |
| WO | WO 2010/053157 | 5/2010 |
| WO | WO 2010/128548 A1 | 11/2010 |

* cited by examiner

NON-AQUEOUS ELECTROLYTE SECONDARY BATTERY

CROSS-REFERENCE TO RELATED APPLICATIONS

This application is a national phase application of International Application No. PCT/JP2010/071179, filed Nov. 26, 2010, the content of which is incorporated herein by reference.

TECHNICAL FIELD

The present invention relates to a non-aqueous electrolyte secondary battery provided with an inorganic filler layer, which contains an inorganic filler and a binder, on a surface of a separator.

BACKGROUND ART

In recent years, the importance of lithium ion batteries, nickel hydride batteries and other secondary batteries as vehicle-mounted batteries and power sources for personal computers and mobile phones has increased. In particular, much is expected of lithium secondary batteries, which are lightweight and achieve high energy density, as batteries able to be advantageously used as vehicle-mounted high output power sources. A positive electrode including a lithium-transition metal composite oxide, a negative electrode including a carbonaceous material and a separator including a porous film between the positive electrode and negative electrode are provided in a typical constitution of this type of lithium secondary battery. Prior art relating to this type of separator is disclosed in Patent Literature 1 and Patent Literature 2.

Single layer separators consisting of porous polyethylene are widely used as the above-mentioned separator. However, single layer separators consisting of porous polyethylene have the advantage of exhibiting a shutdown function at an appropriate temperature (for example, approximately 130° C.), but have the drawback of causing battery performance to deteriorate due to oxidative degradation when exposed to the positive electrode charging potential. Furthermore, single layer separators consisting of porous polyethylene melt and deform at temperatures of 140° C. to 150° C., meaning that if the battery temperature increases even after shutdown, the separator may deform and cause an internal short circuit.

As a result, investigations have been made in recent years into the use of separators obtained by laminating polymer layers having different functions instead of single layer separators consisting of porous polyethylene. For example, Patent Literature 1 discloses a non-aqueous electrolyte secondary battery in which a separator composed of at least three layers, namely a heat-resistant porous polymer layer consisting of a polymer such as an aramid or a polyimide, a porous polyethylene layer and a porous polypropylene layer, a positive electrode is disposed so as to face the porous polypropylene layer, and a negative electrode is disposed so as to face the heat-resistant porous polymer layer. It is said that because the heat-resistant porous polymer layer in this non-aqueous electrolyte secondary battery has a high heat deformation temperature, the shape of the separator can be easily maintained even when thermal shrinkage and the like occurs. More prior art relating to this type of separator is disclosed in Patent Literature 2.

CITATION LIST

Patent Literature

Patent Literature 1: Japanese Patent Application Publication No. 2006-164873
Patent Literature 2: Japanese Patent Application Publication No. 2007-188777

SUMMARY OF INVENTION

In recent years, large lithium secondary batteries such as those used as vehicle driving power sources (for example, lithium secondary batteries for hybrid vehicles) have increased in output, and in cases where short circuits inside batteries due to contamination by foreign objects occur, it is thought that the battery temperature increases dramatically. In such cases, the temperature close to the point of short circuit further increases and can reach several hundred degrees centigrade (for example 300° C. or higher). Therefore, there is a problem that a heat-resistant porous polymer layer consisting of a polymer such as an aramid, such as that disclosed in Patent Literature 1, cannot withstand temperature increases, meaning that the separator melts and further heat may be given off. In addition, a heat-resistant porous polymer layer including an aramid and the like has a low porosity, and therefore inhibits the movement of ions inside an electrode body. Therefore, during repeated high rate charging and discharging, variations occur in lithium salt concentration in a non-aqueous electrolyte that passes through the electrode body, and the durability of the lithium secondary battery against a charging and discharging pattern in which high rate charging and discharging is repeated (high rate charging and discharging cycles) can deteriorate, in other words, the battery performance can deteriorate.

In view of these problems, a primary objective of the present invention is to provide a non-aqueous electrolyte secondary battery having high durability against high rate charging and discharging and excellent safety.

The non-aqueous electrolyte secondary battery according to the present invention includes a positive electrode, a negative electrode and a separator which is interposed between the positive electrode and negative electrode. The aforementioned separator has a two-layer structure which is composed of a porous polyethylene layer mainly composed of polyethylene, and a porous polymer layer mainly composed of a polymer having higher oxidation resistance than that of the polyethylene. Preferred examples of the polymers having high oxidation resistance include polypropylene, polytetrafluoroethylene, polyamides (especially aramids), polyimides, polyvinylidene fluoride, polyacrylonitrile and polyamide-imides. In addition, an inorganic filler layer including an inorganic filler and a binder is formed on the surface of the aforementioned polyethylene layer on which the aforementioned porous polymer layer is not formed.

According to this constitution, because the separator has a two-layer structure which is composed of a porous polyethylene layer and a porous polymer layer, oxidative degradation of the polyethylene layer is inhibited by the porous polymer layer having high oxidation resistance and the separator exhibits good oxidation resistance. Therefore, the separator does not degrade even when exposed to the positive electrode charging potential and it is possible to maintain an appropriate shutdown function. In addition, because an inorganic filler layer including an inorganic filler and a binder is formed on the surface of the polyethylene layer, thermal deformation of the separator is suppressed by the inorganic filler layer, which has a high melting point and excellent heat resistance. Therefore, even if the temperature at a position close to an internal short circuit reaches 500° C. or higher, the separator does not undergo thermal shrinkage and it is possible to inhibit further overheating of the battery. Furthermore, the inorganic filler layer has a relatively high porosity and does not inhibit the movement of ions inside the electrode body. Therefore, it is possible to suppress variations in salt concentration in the non-aqueous electrolyte in the electrode body, which are caused by high rate charging and discharging, and it is possible to suppress an increase in resistance following high rate charging and discharging. That is, according to the present invention, it is possible to provide an optimal non-aqueous electrolyte secondary battery having high durability against high rate charging and discharging and excellent safety.

In a preferred mode of the non-aqueous electrolyte secondary battery disclosed here, the aforementioned inorganic filler layer is disposed on the side of the separator that faces the aforementioned negative electrode. In addition, the aforementioned porous polymer layer is disposed on the side of the separator that faces the aforementioned positive electrode. By disposing the porous polymer layer on the positive electrode side of the separator in this way, it is possible to reliably suppress degradation of the separator, which can be caused by a high positive electrode potential.

In a preferred mode of the non-aqueous electrolyte secondary battery disclosed here, the thickness of the aforementioned porous polymer layer is 30 to 70 relative to a total thickness of the aforementioned porous polyethylene layer and the aforementioned porous polymer layer of 100. If the thickness of the porous polymer layer is higher than the above-mentioned range, variations can occur in salt concentration in the non-aqueous electrolyte present in the electrode body, meaning that resistance tends to increase following high rate charging and discharging cycles. In addition, because the thickness of the polyethylene layer becomes relatively low in such cases, a deterioration in shutdown function can occur. Meanwhile, if the thickness of the porous polymer layer is lower than the above-mentioned range, the oxidation resistance of the separator deteriorates and it may not be possible to maintain the shutdown function.

In a preferred mode of the non-aqueous electrolyte secondary battery disclosed here, the proportion of the inorganic filler in the whole of the aforementioned inorganic filler layer is 90 mass % or higher. If the proportion of the inorganic filler is too less than 90 mass %, the heat resistance of the inorganic filler layer deteriorates, meaning that it may not be possible to inhibit thermal shrinkage of the separator.

In a preferred mode of the non-aqueous electrolyte secondary battery disclosed here, the aforementioned positive electrode has, as a positive electrode active material, a lithium-transition metal composite oxide containing at least one type of metallic element selected from the group consisting of nickel, cobalt and manganese. It is preferable for the aforementioned lithium-transition metal composite oxide to be a lithium-nickel-cobalt-manganese composite oxide. In such cases, the above-mentioned effect can be achieved particularly well.

In a preferred mode of the non-aqueous electrolyte secondary battery disclosed here, the aforementioned positive electrode is a positive electrode sheet having a positive electrode mixture layer on a long sheet-like positive electrode current collector, the aforementioned negative electrode is a negative electrode sheet having a negative electrode mixture layer on a long sheet-like negative electrode current collector, and the aforementioned separator is a long sheet-like separator. In addition, the non-aqueous electrolyte secondary battery in this mode has a wound electrode body in which the aforementioned positive electrode sheet and the aforementioned negative electrode sheet are wound in the longitudinal direction via the aforementioned separator. Variations in salt concentration in non-aqueous electrolytes in electrode bodies, which are caused by high rate charging and discharging, occur particularly easily in non-aqueous electrolyte secondary batteries including this type of wound electrode body, and using the present invention is therefore particularly useful.

In a preferred mode of the non-aqueous electrolyte secondary battery disclosed here, the aforementioned inorganic filler is at least one type of metal oxide selected from the group consisting of alumina, magnesia and zirconia. These metal oxides have high melting points and exhibit high heat resistance, and can therefore be advantageously used as an inorganic filler that is suitable for achieving the objective of the present invention.

All the non-aqueous electrolyte secondary batteries disclosed here exhibit performance suitable for a vehicle-mounted battery (for example, high input/output), and exhibit particularly excellent durability against high rate charging and discharging. According to the present invention, therefore, all the non-aqueous electrolyte secondary batteries disclosed here can be advantageously used as non-aqueous electrolyte secondary batteries for vehicle driving power sources (typically, driving power sources for hybrid vehicles or electric vehicles).

Preferred usage applications of the features disclosed here include non-aqueous electrolyte secondary batteries envisaged as being used in charging and discharging cycles that include high rate charging and discharging, such as 10 C or higher (for example, 10 C to 50 C), or 20 C or higher (for example, 20 C to 40 C).

DESCRIPTION OF EMBODIMENTS

Figure 1:
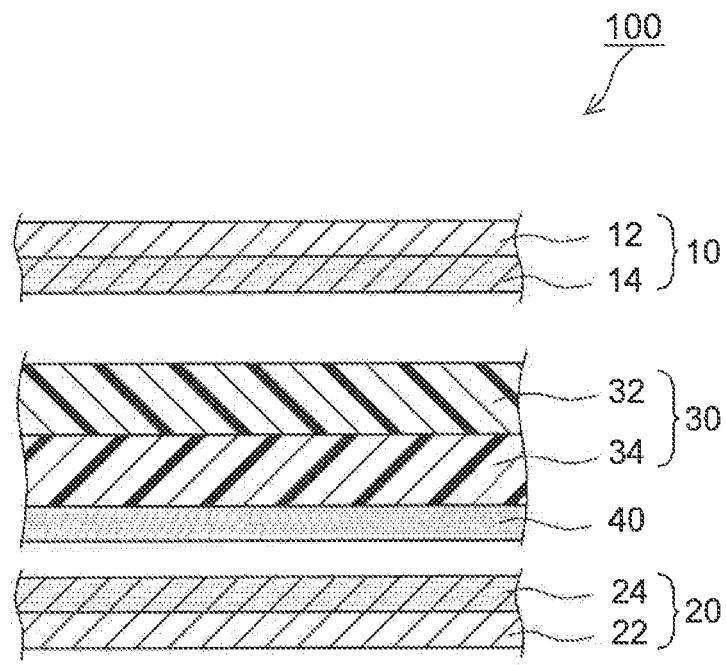
FIG. 1 is a cross-sectional view showing a schematic representation of the main parts of a non-aqueous electrolyte secondary battery according to one embodiment of the present invention.

Embodiments of the present invention will now be explained with reference to the drawings. In the drawings below, members/parts that perform the same action are denoted by the same symbols. Moreover, the dimensional relationships (length, width, thickness and so on) in the drawings do not reflect actual dimensional relationships. In addition, matters other than those explicitly mentioned in the present Description but which are essential for carrying out the invention (for example, the constitution and production method of an electrode body including the positive electrode and negative electrode, the constitution and production method of the non-aqueous electrolyte, and ordinary features relating to the construction of the non-aqueous electrolyte secondary battery or another battery) are design matters that a person skilled in the art could understand on the basis of the prior art in this technical field.

Although not intending to place particular limitations on the present invention, an embodiment of the present invention will now be explained in detail using a lithium secondary battery (a lithium ion secondary battery) as an example. The configuration of the lithium secondary battery according to the present embodiment is shown in FIG. 1.

As shown in FIG. 1, the lithium secondary battery 100 according to the present embodiment includes a positive electrode 10, a negative electrode 20 and a separator 30 which is interposed between the positive electrode 10 and negative electrode 20. The separator 30 has a two-layer structure which is composed of a polyethylene layer 34 and a porous polymer layer 32, and an inorganic filler layer 40 including an inorganic filler and a binder is formed on the surface of the polyethylene layer 34 on which the porous polymer layer 32 is not formed. In this embodiment, the porous polymer layer 32 of the two-layer structure of the separator 30 is disposed on the side of the separator that faces the positive electrode 10. In addition, the inorganic filler layer 40, which is formed on the surface of the polyethylene layer 34 on which the porous polymer layer 32 is not formed, is disposed on the side of the separator that faces the negative electrode 20. Moreover, for reasons of ease of understanding, spaces are shown between the separator 30 and the positive electrode 10 and negative electrode 20 in FIG. 1.

The polyethylene layer 34 used in the separator of the lithium secondary battery disclosed here is composed of polyethylene as a main component. The polyethylene used in the polyethylene layer 34 is not particularly limited and can be a type of polyethylene that is used in conventional lithium secondary battery separators. For example, it is possible to use high density, medium density or low density branched or linear polyethylene. In addition, the polyethylene may, if necessary, contain additives such as plasticizers and antioxidants. The proportion of polyethylene in the whole of the polyethylene layer is not particularly limited, but is generally 75 mass % or higher, preferably 85 mass % or higher, and more preferably 95 mass % or higher. It is particularly preferable for the polyethylene layer 34 to include essentially only polyethylene.

A multiplicity of fine pores are formed in this polyethylene layer 34, and lithium ions can pass through the polyethylene layer 34 due to these fine pores being connected. In addition, the polyethylene layer 34 exhibits a shutdown function due to the polyethylene melting and the fine pores closing when the temperature inside the battery increases. The melting point of the polyethylene is generally 100° C. to 140° C., and preferably 120° C. to 140° C. In addition, the porosity of the polyethylene layer is generally 35% to 60%, and preferably 45% to 55%. By setting the porosity to fall within a prescribed range such as this, it is possible to obtain a polyethylene layer that exhibits both excellent shutdown function and good ion permeability. Moreover, the "porosity" in the Description of the present invention can be calculated using the following procedure. Specifically, a test piece having an area (S) is cut from the separator, and if the thickness of the test piece is denoted by t and the mass of the test piece is denoted by w, the apparent volume is S·t. Here, if the true density of the polyethylene is denoted by d, the volume of polyethylene in the test piece having an area (S) is w/d, and the volume of pores in the test piece is S·t−w/d. Therefore, the porosity of the separator can be calculated from (S·t−w/d)/S·t.

The porous polymer layer 32 used in combination with the above-mentioned polyethylene layer 34 can be joined to the polyethylene layer and is mainly composed of a polymer having higher oxidation resistance than that of the polyethylene. Examples of this type of polymer having high oxidation resistance include polypropylene (PP), polytetrafluoroethylene (PTFE), polyamides (especially aramids), polyimides, polyvinylidene fluoride (PVDF), polyacrylonitrile and polyamide-imides.

Because the above-mentioned polymers exhibit high oxidation resistance, it is possible to suppress oxidative degradation of the polyethylene layer 34 and improve the oxidation resistance of the separator 30 by having the porous polymer layer 32 including the polymers on the surface of the polyethylene layer 34. Therefore, the separator 30 does not degrade even when exposed to the positive electrode 10 charging potential and it is possible to maintain an appropriate shutdown function in the separator 30.

Moreover, the above-mentioned porous polymer layer 32 may, if necessary, contain additives such as plasticizers and antioxidants. The proportion of the above-mentioned polymer in the whole of the porous polymer layer is not particularly limited, but is generally 75 mass % or higher, preferably 85 mass % or higher, and more preferably 95 mass % or higher. It is particularly preferable for the porous polymer layer 32 to include essentially only the above-mentioned polymers.

A multiplicity of fine pores are formed in this porous polymer layer 32, and lithium ions can pass through the porous polymer layer 32 due to these fine pores being connected. The porosity of the porous polymer layer is generally 30% to 55%, and preferably 40% to 50%. By setting the porosity to fall within a prescribed range such as this, it is possible to obtain a porous polymer layer 32 that exhibits both excellent oxidation resistance and good ion permeability.

The separator of the lithium secondary battery disclosed here is constituted from the polyethylene layer 34 and the porous polymer layer 32, as described above, but the thickness ratio of these layers is such that the thickness of the porous polymer layer is 30 to 70 (not lower than 30 and not higher than 70) relative to a total thickness of the aforementioned polyethylene layer and the aforementioned porous polymer layer (that is, the total thickness of the separator) of 100. If the thickness of the porous polymer layer is higher than the above-mentioned range, variations can occur in salt concentration in the non-aqueous electrolyte present in the electrode body, meaning that resistance tends to increase following high rate charging and discharging cycles. In addition, because the thickness of the polyethylene layer becomes relatively low in such cases, a deterioration in shutdown function can occur. Meanwhile, if the thickness of the porous polymer layer is lower than the above-mentioned range, the oxidation resistance of the separator deteriorates and it may not be possible to maintain the shutdown function. From the perspective of post-cycle resistance reduction, the thickness of the porous polymer layer is generally 30 to 50, preferably 30 to 45, and more preferably 30 to 40, relative to a total separator thickness of 100. Meanwhile, from the perspective of ensuring oxidation resistance, the thickness of the porous polymer layer is generally 50 to 70, preferably 55 to 70, and more preferably 60 to 70. Moreover, "thickness" in the Description of the present invention can be determined from cross sectional observations obtained using a scanning electron microscope (SEM).

The total thickness of the separator 30 (the total thickness of the polyethylene layer and the porous polymer layer) may be similar to that of separators used in conventional lithium secondary batteries, for example, about 10 µm to 40 µm, and preferably about 15 µm to 25 µm. The polyethylene layer and the porous polymer layer may be integrated by, for example, joining by means of an adhesive or by heat welding.

In addition, the inorganic filler layer 40 including an inorganic filler and a binder is formed on a surface of the polyethylene layer 34 of the above-mentioned separator 30. In this embodiment, the inorganic filler layer 40 is disposed on the side of the separator that faces the negative electrode 20. The inorganic filler layer 40 is composed of an inorganic filler and a binder, and binding occurs between inorganic filler particles and between inorganic filler particles and the polyethylene layer 34 by means of the binder. The inorganic filler layer 40 has a multiplicity of fine pores at locations there binding by the binder does not occur, and lithium ions can pass through the inorganic filler layer 40 due to these fine pores being connected. In addition, the inorganic filler layer 40 exhibits a degree of heat resistance whereby the inorganic filler layer 40 does not melt in a temperature region that is higher than a temperature region wherein the polyethylene layer 34 and the porous polymer layer 32 melt (for example, a temperature of 300° C. to 1,000° C. or higher).

The inorganic filler used in the above-mentioned inorganic filler layer 40 is preferably one that has a high melting point (for example, 1,000° C. or higher), exhibits excellent heat resistance and is electrochemically stable in a battery usage environment. Examples of this type of inorganic filler include metal oxides such as alumina ($Al_2O_3$), boehmite ($Al_2O_3 \cdot H_2O$), magnesia (MgO) and zirconia ($ZrO_2$). One, two or more types of these inorganic fillers may be used. Of these, the use of alumina is preferred.

Because the above-mentioned inorganic filler has a high melting point and exhibits excellent heat resistance, heat deformation of the separator 30 is suppressed due to the inorganic filler layer 40, which includes the inorganic filler being formed on the surface of the polyethylene layer 34 on which the porous polymer layer 32 is not formed. Therefore, even if the temperature at a position close to an internal short circuit reaches a high temperature, the separator 30 does not undergo thermal shrinkage and it is possible to inhibit further overheating of the battery. Melting points of inorganic fillers are, for example, approximately 2020° C. for alumina ($Al_2O_3$), approximately 2800° C. for magnesia (MgO) and approximately 2700° C. for zirconia ($ZrO_2$).

The volume average particle diameter ($D_{50}$), as measured using an ordinary commercially available particle size meter (for example, a laser diffraction or dynamic light-scattering particle size distribution measurement device), of the above-mentioned filler is generally 0.05 µm to 1.5 µm, and preferably 0.1 µm to 1 µm.

Moreover, the inorganic filler layer 40 is disposed on the side of the separator that faces the negative electrode 20 in this embodiment. The negative electrode side is at a lower potential than the positive electrode side. Therefore, even if an inorganic filler that contains large quantities of impurities is used, release of impurities due to a high potential does not occur and the inorganic filler can be stably used (at low cost). The purity of the inorganic filler is generally 98% to 99.9%, preferably 98.5% to 99.8%, and more preferably approximately 99%.

The binder used in the above-mentioned inorganic filler layer is used in order to bind particles of the above-mentioned inorganic filler, and the material per se that constitutes the binder is not particularly limited, and can be a wide variety of materials. Preferred examples thereof include acrylic polymers. Preferred examples of acrylic polymers include homopolymers obtained by polymerizing a single type of monomer, such as acrylic acid, methacrylic acid, acrylamide, methacrylamide, 2-hydroxyethyl acrylate, 2-hydroxyethyl methacrylate, methacrylate, methyl methacrylate, ethylhexyl acrylate and butyl acrylate. In addition, the acrylic polymer may also be a copolymer obtained by polymerizing two or more of the above-mentioned monomers. Furthermore, it is possible to use a mixture of two or more types of the above-mentioned homopolymers and copolymers. In addition to the above-mentioned acrylic polymers, it is possible to use polyvinylidene fluoride, polytetrafluoroethylene (PTFE), polyacrylonitrile, polymethyl methacrylate and the like.

Although not particularly limited, the proportion of the inorganic filler in the whole of the inorganic filler layer is generally approximately 90 mass % or higher (typically 90 mass % to 99 mass %), preferably approximately 95 mass % to 99 mass %, and more preferably approximately 97 mass % to 99 mass %. If the proportion of the inorganic filler is too low, the heat resistance of the inorganic filler layer deteriorates, meaning that it may not be possible to inhibit thermal shrinkage of the separator. Meanwhile, if the proportion of the inorganic filler is too high, the quantity of binder in the inorganic filler layer becomes relatively low, meaning that the mechanical strength of the inorganic filler layer may decrease and adhesion to the separator may deteriorate. From the perspective of ensuring heat resistance, the proportion of the binder in the whole of the inorganic filler layer should be approximately 10 mass % or lower, and preferably 5 mass % or lower (typically 1 to 5 mass %). Furthermore, in an inorganic filler layer having a composition that contains a thickening agent, as described below, the proportion of the thickening agent in the inorganic filler layer can be approximately 5 mass % or lower, and preferably 2 mass % or lower (typically 0.5 to 2 mass %).

The porosity of the above-mentioned inorganic filler layer is generally 40% to 70%, and preferably 45% to 60%. By setting the porosity to fall within a prescribed range such as this, it is possible to obtain an inorganic filler layer 40 that exhibits both good ion permeability and high mechanical strength.

In addition, the thickness of the inorganic filler layer can be selected as appropriate according to the intended use of the separator, but is generally 1 µm to 20 µm, preferably 3 µm to 10 µm, and more preferably 2 µm to 8 µm. If the inorganic filler layer is too thin, it may not be possible to suppress thermal shrinkage of the separator, and if the inorganic filler layer is too thick, resistance tends to increase following high rate charging and discharging cycles.

A method for forming the inorganic filler layer according to the present embodiment will now be explained. The coating material for forming the inorganic filler layer can be a paste (including a slurry or ink. Hereinafter also) obtained by mixing and dispersing and inorganic filler, a binder and a solvent. The inorganic filler layer can be formed by coating an appropriate quantity of this paste-like material on the surface of the polyethylene layer 34 of the separator 30 and then drying.

The solvent used in the coating material for forming the inorganic filler layer can be an organic solvent such as N-methylpyrrolidone (NMP), pyrrolidone, methyl ethyl ketone, methyl isobutyl ketone, cyclohexanone, toluene, dimethyl formamide and dimethyl acetamide, or a combination of two or more of these solvents. Alternatively, it is possible to use water or a mixed solvent composed mainly of water. Solvents other than water that constitute the mixed solvent can be one, two or more types selected as appropriate from among organic solvents able to be homogeneously mixed with water (lower alcohols, lower ketones and the like). The content of the solvent in the coating material for forming the porous layer is not particularly limited, but is preferably 40 to 90 mass % of the overall coating material.

In addition to the inorganic filler and the binder, the above-mentioned coating material for forming the inorganic filler layer may, if necessary, contain one, two or more types of materials able to be used. Examples of such type of material include polymers that function as thickening agents for materials for forming inorganic filler layers. In cases where a water-based solvent is used in particular, it is preferable to incorporate a polymer that functions as the above-mentioned thickening agent. The polymer that functions as the thickening agent is preferably carboxymethyl cellulose (CMC) or poly(ethylene oxide) (PEO).

The process for mixing the above-mentioned inorganic filler and binder with the solvent can be carried out using an appropriate mixing device, such as a Clearmix, a Filmix, a ball mill, a homodisper or an ultrasonic disperser. It is possible to form the inorganic filler layer by coating the coating material for forming the inorganic filler layer on the surface of the polyethylene layer of the separator and then drying.

The process of coating the coating material for forming the inorganic filler layer on the surface of the polyethylene layer of the separator is not particularly limited and can use conventional coating means. For example, a prescribed quantity of the above-mentioned coating material for forming the porous layer can be coated at a uniform thickness by using an appropriate coating device (such as a gravure coater, slit coater, die coater, comma coater or dip coater). The coated material is then dried using appropriate drying means (typically at a low-temperature below the melting point of the separator, for example 110° C. or lower, or to 80° C.), thereby removing the solvent from the coating material for forming the inorganic filler layer. By removing the solvent from the coating material for forming the inorganic filler layer, an inorganic filler layer that contains an inorganic filler and a binder can be formed. In this way, it is possible to form the inorganic filler layer on the surface of the polyethylene layer of the separator.

As shown in FIG. 1, the inorganic filler layer-containing separator 30 obtained in this way is such that because the separator 30 has a two-layer structure which is composed of the polyethylene layer 34 and the porous polymer layer 32, oxidative degradation of the polyethylene layer 34 is suppressed by the porous polymer layer 32, which exhibits high oxidation resistance, and the oxidation resistance of the separator 30 is therefore good. Therefore, the separator 30 does not degrade even when exposed to the positive electrode 10 charging potential and it is possible to maintain an appropriate shutdown function. In addition, because the inorganic filler layer 40, which includes an inorganic filler and a binder, is formed on the surface of the polyethylene layer 34 on which the porous polymer layer 32 is not formed, thermal deformation of the separator 30 is suppressed by the inorganic filler layer 40, which has a high melting point and excellent heat resistance. Therefore, even if the temperature at a position close to an internal short circuit reaches a high temperature, the separator 30 does not undergo thermal shrinkage and it is possible to inhibit further overheating of the battery. Furthermore, the inorganic filler layer has a relatively high porosity and does not inhibit the movement of ions inside the electrode body. Therefore, it is possible to suppress variations in salt concentration in the non-aqueous electrolyte in the electrode body, which are caused by high rate charging and discharging, and it is possible to suppress an increase in resistance following high rate charging and discharging cycles. That is, according to the present constitution, it is possible to provide an optimal non-aqueous electrolyte secondary battery having high durability against high rate charging and discharging and excellent safety.

The inorganic filler layer-containing separator disclosed here exhibits high durability against high rate charging and discharging, as described above, and is safe over a long period of time, and can therefore be advantageously used as a constituent element in a variety of battery types or a constituent element in an electrode body housed in the batteries. For example, the inorganic filler layer-containing separator disclosed here can be advantageously used as a constituent element in a lithium secondary battery including the inorganic filler layer-containing separator disclosed here, a positive electrode and a negative electrode separated by the separators, and a non-aqueous electrolyte disposed between the positive and negative electrodes. The structure (for example, a metal housing or laminate film structure) and size of an external container constituting the battery and the structure (for example, winding structure or laminate structure) of an electrode body having positive and negative electrode current collectors as primary constituent elements are not particularly limited.

An embodiment of a lithium secondary battery constituted using the above-mentioned separator 30 having an inorganic filler layer 40 will now be explained by referring to the schematic diagrams shown in FIGS. 2 and 3.

Figure 2:
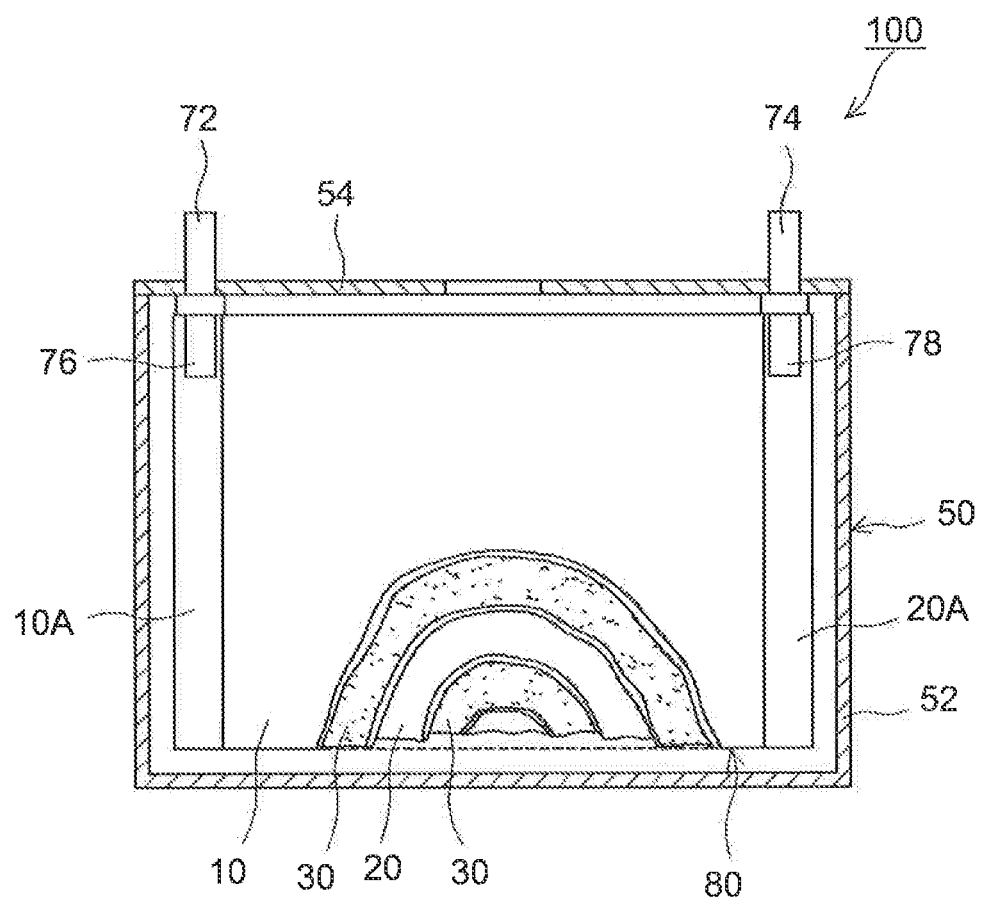
FIG. 2 is a diagram showing a schematic representation of a non-aqueous electrolyte secondary battery according to one embodiment of the present invention.

As shown in FIG. 2, a lithium secondary battery 100 according to the present embodiment is provided with a metal (a resin or laminate film is also suitable) case 50. This case (external container) 50 includes a flat rectangular case main body 52, the top of which is open, and a lid 54 that seals this opening. The upper surface (that is, the lid 54) of the case 50 is provided with a positive electrode terminal 72, which is electrically connected to the positive electrode 10 of a wound electrode body 80, and a negative electrode terminal 74, which is electrically connected to the negative electrode 20. A flat wound electrode body 80, which is produced by, for example, laminating and winding a long sheet-like positive electrode (positive electrode sheet) 10 and a long sheet-like negative electrode (negative electrode sheet) 20 together with two sheets of a long sheet-like separator (separator sheet) 30 and then squashing the obtained wound body by pushing from the sides, is housed inside the case 50.

Figure 3:
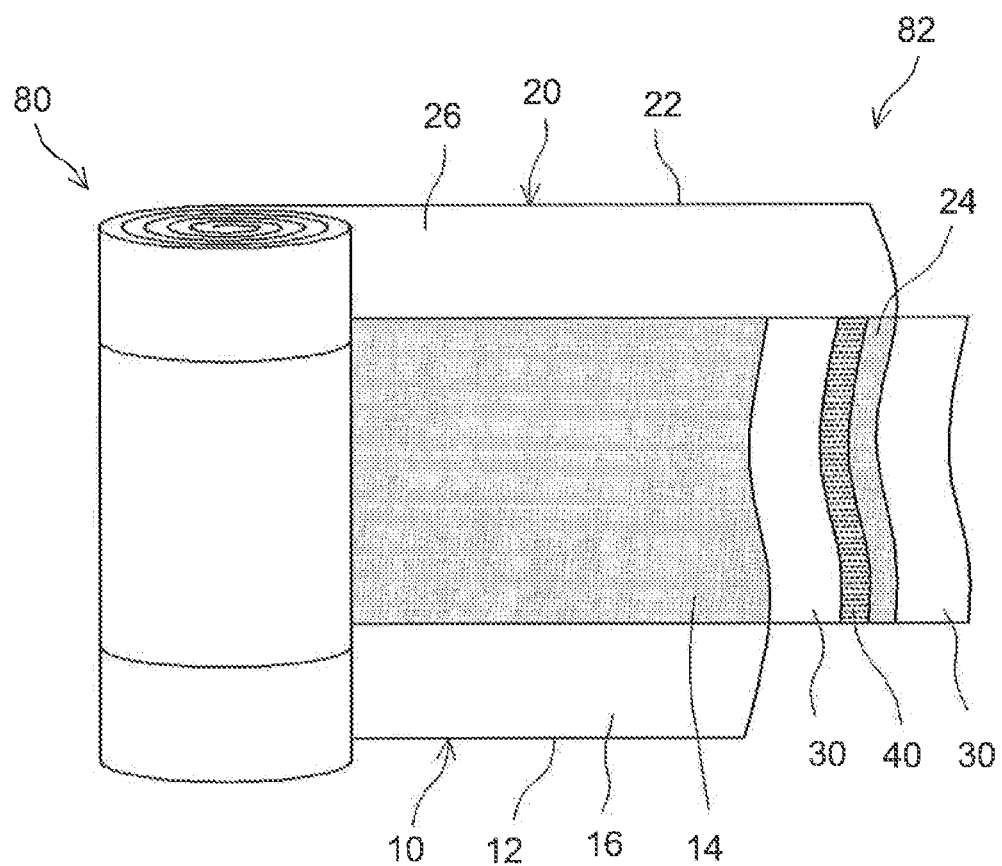
FIG. 3 is a diagram showing a schematic representation of a wound electrode body according to one embodiment of the present invention.

The wound electrode body 80 is formed by winding a sheet-like electrode body 82, as shown in FIG. 3. The sheet-like electrode body 82 has a long (belt-like) sheet structure in a previous stage in which the wound electrode body 80 is assembled. The shed-like electrode body 82 is formed by laminating the positive electrode sheet 10 and the negative electrode sheet 20 together with two sheets of the separator sheet 30, in the same way as a typical wound electrode body.

The positive electrode sheet 10 is formed by attaching a positive electrode active material layer 14 on both surfaces of a long sheet-like foil-like positive electrode current collector 12. However, the positive electrode active material layer 14 is not attached to one side edge along the edge of the positive electrode sheet 10 in the width direction of the sheet-like electrode body, meaning that a certain width of the positive electrode current collector 12 is exposed. An aluminum foil (in the present embodiment) or other metal foil suitable for use in a positive electrode can be advantageously used in the positive electrode current collector 12. The positive electrode active material layer 14 is composed of a positive electrode active material and, if necessary, other positive electrode active material layer-forming components (for example, an electrical conductivity aid, a binder and the like).

The positive electrode active material is not particularly limited, and can be one, two or more types of materials used in lithium secondary batteries in the past. Preferred examples of the positive electrode active material disclosed here include positive electrode active materials including oxides, as a main component, containing lithium and a transition metal element as constituent metal elements, such as lithium nickel oxide ($LiNiO_2$), lithium cobalt oxide ($LiCoO_2$) and lithium manganese oxide ($LiMn_2O_4$). Of these, positive electrode active materials mainly including lithium-nickel-cobalt-manganese composite oxides (for example, $LiNi_{1/3}Co_{1/3}Mn_{1/3}O_2$) (typically, positive electrode active materials including essentially lithium-nickel-cobalt-manganese composite oxides) are preferred.

Here, lithium-nickel-cobalt-manganese composite oxide means an oxide that contains at least one type of metal element other than Li, Ni, Co and Mn (that is, a transition metal element and/or typical metal element other than Li, Ni, Co and Mn) in addition to an oxide containing Li, Ni, Co and Mn as constituent metal elements. These metal elements can be, for example, one, two or more types selected from the group consisting of Al, Cr, Fe, V, Mg, Ti, Zr, Nb, Mo, W, Cu, Zn, Ga, In, Sn, La and Ce. The same applies to lithium-nickel oxides, lithium-cobalt oxides and lithium-manganese oxides.

This type of lithium-transition metal oxide (typically in particulate form) can be a lithium-transition metal oxide powder prepared using a conventional publicly known method. For example, a lithium-transition metal oxide powder constituted essentially from secondary particles having an average particle diameter of approximately 1 μm to 25 m can be advantageously used as the positive electrode active material.

In the same way as the positive electrode sheet 10, the negative electrode sheet 20 is formed by attaching a negative electrode active material layer 24 to both surfaces of a long sheet-like foil-like negative electrode current collector 22. However, the negative electrode active material layer 24 is not attached to one side edge along the edge of the negative electrode sheet 20 in the width direction of the sheet-like electrode body, meaning that a certain width of the negative electrode current collector 22 is exposed. A copper foil (in the present embodiment) or other metal foil suitable for use in a negative electrode can be advantageously used in the negative electrode current collector 22. The negative electrode active material layer 24 is composed of a negative electrode active material and, if necessary, other negative electrode active material layer-forming components (for example, a binder and the like). The negative electrode active material is not particularly limited, and can be one, two or more types of materials used in lithium secondary batteries in the past. Preferred examples thereof include carbonaceous materials such as graphite carbon or amorphous carbon (graphite in the present embodiment), and lithium-containing transition metal oxides and transition metal nitrides.

The separator sheet 30 having the inorganic filler layer 40, which is used between the positive and negative electrode sheets 10 and 20, is the same as that described above, and an explanation thereof is therefore omitted here.

When constructing the above-mentioned wound electrode body, the inorganic filler layer 40 formed on the surface of the separator sheet 30 faces the negative electrode active material layer 24 of the negative electrode sheet 20, and the positive electrode sheet 10 and the negative electrode sheet 20 are staggered to a certain extent in the width direction so that the part of the positive electrode sheet 10 on which the positive electrode active material layer is not formed and the part of the negative electrode sheet 20 on which the negative electrode active material layer is not formed each protrude from the sides of the separator sheet 30 in the width direction thereof. As a result, in the horizontal direction relative to the winding direction of the wound electrode body 80, the parts of the positive electrode sheet 10 and negative electrode sheet 20 on which the electrode active material layers are not formed protrude externally from the winding core part (that is, the parts where the part of the positive electrode sheet 10 on which the positive electrode active material layer is formed and the part of the negative electrode sheet 20 on which the negative electrode active material layer is formed are wound tightly with the two separator sheets 30). A positive electrode lead terminal 76 and a negative electrode lead terminal 78 are provided at the positive electrode side protruding part (that is, the part on which the positive electrode mixture layer is not formed) 10A and the negative electrode side protruding part (that is, the part on which the negative electrode mixture layer is not formed) 20A respectively, and are electrically connected to the above-mentioned positive electrode terminal 72 and negative electrode terminal 74 respectively.

In addition, with the wound electrode body 80 housed in the case main body 52, an electrolyte liquid that contains a suitable electrolyte is disposed (injected) from the upper opening of the case main body 52 into the case main body 52. The electrolyte is, for example, a lithium salt such as $LiPF_6$. For example, it is possible to dissolve an appropriate quantity of a lithium salt such as $LiPF_6$ (for example at a concentration of 1 M) in a non-aqueous electrolyte (a non-aqueous electrolyte liquid) such as a mixed solvent of diethyl carbonate and ethylene carbonate (at a mass ratio of for example, 1:1), and use this as an electrolyte liquid.

The above-mentioned opening is then sealed by, for example, welding to the lid 54, thereby completing the assembly of the lithium secondary battery 100 according to the present embodiment. The case 50 sealing process and the electrolyte disposal (injection) process do not characterize the present invention and may be similar to methods carried out when producing conventional lithium secondary batteries. In this way, the constitution of the lithium secondary battery 100 according to the present embodiment is complete.

The lithium secondary battery 100 constructed in this way is such that the separator 30 exhibits good oxidation resistance, as described above, and thermal shrinkage of the separator 30, which is caused by heat generated when an internal short circuit occurs, can be advantageously suppressed, and therefore exhibits excellent battery performance. For example, by constructing a battery (for example, a lithium secondary battery) using the above-mentioned separator 30 having the inorganic filler layer 40, it is possible to provide a battery which achieves at least one (and preferably all) of high safety, little increase in resistance after high rate charging and discharging cycles, and low initial resistance.

Working examples relating to the present invention will now be explained, but the present invention is in no way limited to the following working examples.

[Inorganic Filler Layer]

Working Example 1

In the present example, a coating material for forming an inorganic filler layer was prepared by dispersing an alumina powder (average particle diameter ($D_{50}$)=0.1 μm, purity=99.99%) as an inorganic filler, an acrylic polymer as a binder and carboxymethyl cellulose as a thickening agent in water so that the mass ratio of these components was 96:3:1 in terms of solid content. An inorganic filler layer was formed by coating this coating material for forming an inorganic filler layer on a surface of a porous PE layer of a separator having a two-layer structure which is composed of polypropylene (PP) and polyethylene (PE) and drying it. In the present example, the porous PP layer had a thickness of 10 μm and a porosity of 45%, as shown in Table 1. In addition, the porous PE layer had a thickness of 10 μm and a porosity of 55%. In addition, the inorganic filler layer had a thickness of 5 μm and a porosity of 60%.

Working Example 2

In the present example, an inorganic filler layer was formed in the same way as in Working Example 1, except that the inorganic filler layer had a thickness of 10 μm.

Working Example 3

In the present example, an inorganic filler layer was formed in the same way as in Working Example 1, except that the purity of the alumina powder used in the inorganic filler layer was 99.8%.

Working Example 4

In the present example, an inorganic filler layer was formed in the same way as in Working Example 1, except that the porous PP layer had a thickness of 6 μm and the porous PE layer had a thickness of 14 μm.

Working Example 5

In the present example, an inorganic filler layer was formed in the same way as in Working Example 1, except that the porous PP layer had a thickness of 14 μm and the porous PE layer had a thickness of 6 μm.

Comparative Example 1

In the present example, a separator having a three-layer structure including polypropylene (PP)/polyethylene (PE)/polypropylene (PP) was used. In addition, an inorganic filler layer was formed in the same way as in Working Example 1 on a surface of one of the porous PP layers of the separator. The porosity of each layer was the same as in Working Example 1. The thickness of each layer was as shown in Table 1.

Comparative Example 2

In the present example, a porous aramid layer was formed instead of an inorganic filler layer. The porous aramid layer was formed as follows. First, anhydrous calcium chloride was heated and dissolved in N-methylpyrrolidone (NMP) and then allowed to return to ambient temperature, after which para-phenylenediamine was added to, and dissolved in, the obtained solution. Next, poly-para-phenylene terephthalamide was synthesized by adding terephthalic acid dichloride in a dropwise manner and allowing a polymerization reaction to progress. The obtained solution was diluted using a solution obtained by dissolving calcium chloride in NMP, coated on the PE layer of the separator and then dried to give a laminated film. This laminated film was thoroughly washed with pure water to remove the calcium chloride and make the aramid layer porous, after which the laminated film was dried. The porosity of the porous aramid layer was 40%. The thickness of each layer was as shown in Table 1.

Comparative Example 3

In the present example, a porous aramid layer was formed in the same way as in Comparative Example 2, except that the porous aramid layer had a thickness of 10 μm,

TABLE 1

| | PP (μm) | PE (μm) | PP (μm) | Inorganic filler layer (μm) | Cell temp. (° C.) at short circuit | Initial resistance (mΩ) | Post-cycle resistance (mΩ) | Resistance increase rate |
|---|---|---|---|---|---|---|---|---|
| Working Example 1 | 10 | 10 | — | 5 | 60 | 2.69 | 3.20 | 1.19 |
| Working Example 2 | 10 | 10 | — | 10 | 60 | 2.83 | 3.43 | 1.21 |
| Working Example 3 | 10 | 10 | — | 5 | 60 | 2.70 | 3.22 | 1.19 |
| Working Example 4 | 6 | 14 | — | 5 | 58 | 2.72 | 2.96 | 1.09 |
| Working Example 5 | 14 | 6 | — | 5 | 61 | 2.68 | 3.41 | 1.27 |
| Comparative Example 1 | 7 | 6 | 7 | 5 | 60 | 2.71 | 4.35 | 1.61 |

TABLE 1-continued

|  | PP (μm) | PE (μm) | PP (μm) | Porous aramid layer (μm) | Cell temp. (°C.) at short circuit | Initial resistance (mΩ) | Post-cycle resistance (mΩ) | Resistance increase rate |
|---|---|---|---|---|---|---|---|---|
| Comparative Example 2 | 10 | 10 | — | 5 | 250 | 3.16 | 5.97 | 1.89 |
| Comparative Example 3 | 10 | 10 | — | 10 | 230 | 3.78 | 7.18 | 1.90 |

Test lithium secondary batteries obtained using the separators having an inorganic filler or aramid layer according to the above-mentioned Working Examples 1 to 5 and Comparative Examples 1 to 3 were constructed and evaluated in terms of performance. The test lithium secondary batteries were constructed as follows.

[Positive Electrode Sheet]

A paste for a positive electrode active material layer was prepared by mixing a powdered lithium-nickel-cobalt-manganese composite oxide ($LiNi_{1/3}Co_{1/3}M_{1/3}O_2$) as a positive electrode active material, acetylene black (AB) as an electrically conductive material and polyvinylidene fluoride (PVdF) as a binder in N-methylpyrrolidone (NMP) so that the mass ratio of these components was 90:8:2. A positive electrode sheet in which a positive electrode active material layer was provided on both surfaces of a positive electrode current collector was prepared by coating this paste for a positive electrode active material layer in a belt-like pattern on both surfaces of a long sheet-like aluminum foil (the positive electrode current collector). The coating quantity of the paste for a positive electrode active material layer was adjusted to be a total of approximately 20 mg/cm$^2$ (in terms of solid content) on both surfaces.

[Negative Electrode Sheet]

A paste for a negative electrode active material layer was prepared by dispersing a graphite powder as a negative electrode active material, a styrene-butadiene rubber (SBR) as a binder and carboxymethyl cellulose (CMC) as a thickening agent in water so that the mass ratio of these components was 98:1:1. A negative electrode sheet in which a negative electrode active material layer was provided on both surfaces of a negative electrode current collector was prepared by coating this paste for a negative electrode active material layer on both surfaces of a long sheet-like copper foil (the negative electrode current collector). The coating quantity of the paste for a negative electrode active material layer was adjusted to be a total of approximately 10 mg/cm$^2$ (in terms of solid content) on both surfaces.

[Lithium Secondary Battery]

A wound electrode body was prepared by winding the positive electrode sheet and the negative electrode sheet via two separators. In this case, the porous inorganic filler layer or porous aramid layer formed on the porous PE layer of the separator was wound so as to face the negative electrode sheet (that is, wound so that the PP layer of the separator faced the positive electrode sheet). Moreover, in the layout shown in Table 1, the layers closest to the positive electrode side are shown in order from the left. The wound electrode body obtained in this way was housed in a battery container (a 18650 type cylindrical container in this case) together with a non-aqueous electrolyte (a non-aqueous electrolyte liquid), and the opening in the battery container was hermetically sealed. The non-aqueous electrolyte liquid was a non-aqueous electrolyte containing $LiPF_6$ as a supporting electrolyte at a concentration of approximately 1 mol/L in a mixed solvent containing ethylene carbonate (BC), dimethyl carbonate (DMC) and ethyl methyl carbonate (EMC) at a volume ratio of 1:1:1. The test lithium secondary battery was assembled in this way. Moreover, the theoretical capacity of this lithium secondary battery was 4 Ah. The lithium secondary batteries according to Working Examples 1 to 5 and Comparative Examples 1 to 3 were constructed in this way.

[Foreign Matter-Induced Internal Short Circuit Test]

The lithium secondary batteries of Working Examples 1 to 5 and Comparative Examples 1 to 3, which were prepared as described above, were subjected to a foreign matter-induced internal short circuit test. First, the battery was charged to the charge upper limit voltage (4.2 V) at a current capable of supplying the battery capacity, which was predicted from the theoretical capacity, in 5 hours that is, ⅕ C), and the battery was then further charged at a fixed voltage until the current reached a value corresponding to ¹/₁₀th of the initial current. Next, the battery was disassembled in a dry atmosphere after being charged and the wound electrode body was removed from the battery container. A small piece of SUS stainless steel with L-shape having a length of each side of 2 mm, a width of 0.1 mm and a height of 0.2 mm was then placed between the separator and the positive electrode sheet of the outermost positive and negative electrode pair in the wound electrode body. The wound electrode body into which the small SUS piece had been inserted was then returned to the battery container, which was processed so that the part at which the small SUS piece was inserted could be pressurized, the battery was heated in at atmosphere at 60° C., and the part at which the small SUS piece was inserted was pressurized from the outside, thereby causing an internal short circuit. At this point, a thermocouple was attached to the outermost surface of the battery container and the temperature of the battery while the test was being carried out (the maximum temperature reached) was measured.

[High Rate Pulse Cycle Test]

In addition, the lithium secondary batteries according to Working Examples 1 to 5 and Comparative Examples 1 to 3 were each subjected to a high rate pulse cycle test by means of a charging and discharging pattern in which high rate pulse charging and discharging was repeated for 10 seconds at 40 A (corresponding to 10 C). Specifically, a battery in a discharged state was charged at ⅕ C at room temperature (approximately 25° C.) until the charge voltage reached 3.7 V, and the battery was then further charged at a fixed voltage until the current reached a value corresponding to ¹/₁₀th of the initial current. After being charged, the battery was subjected to 10,000 repetitions of a high rate pulse cycle in which high rate pulse discharging was carried out for 10 seconds at 40 A (10 C), the battery was then allowed to rest for 10 seconds and high rate pulse charging was carried out for 10 seconds at 40 A (10 C). Next, the resistance increase rate was calculated from the IV resistance prior to the above-mentioned charging and discharging cycle test (the initial resistance of the lithium secondary battery) and the IV resistance following the charging and discharging cycle test. Here, the IV resistance values before and after the charging and discharging cycles were calculated from the decrease in voltage between after charging until the charge voltage reached 3.7 V and after discharging for 10 seconds when discharging was carried out at 25° C. and 40 A. That is, the IV resistance was deemed to be the value obtained by dividing the decrease in voltage by the current (40 A). Moreover, the above-mentioned IV resistance increase rate is determined from "IV resistance following the charging and discharging cycle test/IV resistance prior to the charging and discharging cycle test". The results are shown in Table 1.

As is clear from Table 1, the batteries according to Working Examples 1 to 5 had lower initial resistance values than the batteries according to Comparative Examples 1 to 3. In addition, even after 10,000 cycles of high rate charging and discharging, the IV resistance values of the batteries according to Working Examples 1 to 5 hardly increased, and these batteries exhibited extremely low IV resistance increase rates of 1.27 or lower. Furthermore, no heat generation was observed in the foreign matter-induced internal short-circuit test, and it was confirmed that these were highly safe batteries.

However, the battery according to Comparative Example 1 was almost the same as Working Example 5 in terms of initial resistance value, but exhibited a large increase in IV resistance after 10,000 cycles of high rate charging and discharging. Because this occurrence was seen in Comparative Example 1, despite this battery having a total separator thickness similar to that of Working Example 5, it can be said that having an intermediate PP layer (on the inorganic filler layer side) affects the high rate charging and discharging cycle characteristics. That is, it is thought that an increase in resistance occurred following the cycles in Comparative Example 1 due to movement of ions being affected by an increase in the number of PE/PP boundaries and the salt concentration in the electrolyte liquid present in the electrode body not being uniform.

In addition, the batteries according to Comparative Examples 2 and 3, in which a porous aramid layer was formed instead of an inorganic filler layer, had higher initial resistance values and also had higher IV resistance increase rates after 10,000 cycles of high rate charging and discharging than the batteries according to Working Examples 1 to 5. It is thought that the reason for this is that in Comparative Examples 2 and 3, the porous aramid layer had a low porosity, which affected the movement of ions, and variations in salt concentration in the electrolyte liquid present in the electrode body increased, meaning that resistance following the cycles increased. Furthermore, it was found that in Comparative Examples 2 and 3, the separator melted and the short circuited part increased in area in the foreign matter-induced internal short circuit test, meaning that heat of 230° C. or higher was generated.

It is found from the results mentioned above that according to the present working examples, it is possible to construct a battery which exhibits a low resistance increase rate following high rate charging and discharging cycles and which does not suffer from abnormal heat generation in a foreign matter-induced short circuit test by imparting a separator with a two-layer structure which is composed of a porous polyethylene layer and a porous polypropylene layer and forming a porous inorganic filler layer on the surface of the porous polyethylene layer on which the porous polymer layer is not formed. According to the present constitution, therefore, it is possible to provide a non-aqueous electrolyte secondary battery having high durability against high rate charging and discharging and excellent safety.

Moreover, it is found from a comparison of Working Examples 1, 4 and 5 that the resistance increase rate following the cycles tended to increase as the porous polypropylene layer became thicker. In the case of the batteries used here, by setting the thickness of the porous polypropylene layer to be 30 to 70 relative to a total thickness of the porous polyethylene layer and the porous polypropylene layer of 100, it was possible to achieve a resistance increase rate of 1.27 or lower, and by setting the thickness of the porous polypropylene layer to the 30 to 50 in particular, it was possible to achieve an extremely low resistance increase rate of 1.19 or lower. It is found from these results that from the perspective of reducing the resistance increase rate following the cycles, the thickness of the porous polypropylene layer is 30 to 70, and more preferably 30 to 50, relative to a total thickness of the porous polyethylene layer and the porous polypropylene layer of 100.

In addition, it is found from a comparison of Working Examples 1 and 3 that according to the present constitution, even if an inorganic filler containing large quantities of impurities is used, because the inorganic filler layer faces the negative electrode side, the release of impurities due to high potential does not occur, and it is possible to stably use the inorganic filler.

The present invention has been explained above through the use of preferred embodiments and working examples, but is in no way limited by these matters, and a variety of modifications are of course possible.

For example, as long as the preferred separator having a porous inorganic filler layer disclosed here is used, the shape (external shape or size) of a non-aqueous electrolyte secondary battery to be constructed is not particularly limited. The exterior covering of the battery may be a thin sheet type composed of a laminate film and the like, and the external battery case may be cylindrical or cuboid or a small button-like battery case.

Figure 4:
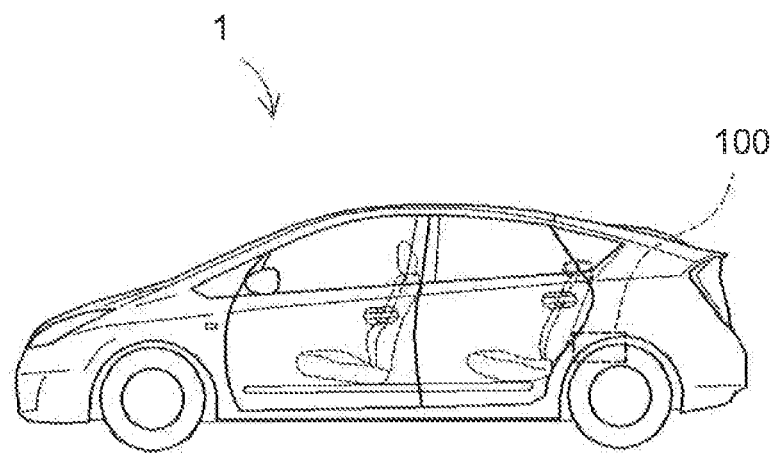
FIG. 4 is a side view of a vehicle on which is mounted a non-aqueous electrolyte secondary battery according to one embodiment of the present invention.

Moreover, any of the non-aqueous electrolyte secondary batteries 100 disclosed here that is, non-aqueous electrolyte secondary batteries characterized by using a separator having an inorganic filler layer) exhibits performance suitable for a vehicle-mounted battery (a non-aqueous electrolyte secondary battery for a vehicle driving power source), and can exhibit particularly excellent durability against high rate charging and discharging. Therefore, a vehicle 1 provided with any of the non-aqueous electrolyte secondary batteries 100 disclosed here is provided by the present invention, as shown in FIG. 4. In particular, a vehicle 1 (for example, an automobile) having the non-aqueous electrolyte secondary battery 100 as a power source (typically, a driving power source for a hybrid vehicle or electric vehicle) is provided.

In addition, preferred usage applications of the features disclosed here include non-aqueous electrolyte secondary batteries envisaged as being used in charging and discharging cycles that include high rate charging and discharging, such as 10 C or higher (for example, 10 C to 50 C), or 20 C or higher (for example, 20 C to 40 C).

INDUSTRIAL APPLICABILITY

According to the constitution of the present invention, it is possible to provide a high performance non-aqueous electrolyte secondary battery having high durability against high rate charging and discharging and excellent safety.

The invention claimed is:

1. A non-aqueous electrolyte secondary battery comprising:
a positive electrode;
a negative electrode;
an inorganic filer layer-containing separator interposed between the positive electrode and negative electrode, the inorganic filler layer-containing separator comprising
a resin separator component comprising a two-layer structure consisting of
a porous polyethylene layer mainly composed of polyethylene, and
a porous polymer layer mainly composed of polytetrafluoroethylene, a polyamide, a polyimide, an aramid, polyvinylidene fluoride, polyacrylonitrile, or a polyamide-imide, the thickness of the porous polymer layer being 30 to 45 relative to a total separator thickness of the resin separator component being 100, and
an inorganic filler layer including an inorganic filler and a binder, formed on and directly bound with, by means of the binder, a surface of the polyethylene layer being not provided with the porous polymer layer, wherein
the inorganic filler layer is disposed on a side facing the negative electrode,
the inorganic filler is metal oxides having a high melting point of 1000° C. or higher,
the proportion of the inorganic filler is 90 mass % or more and 99 mass % or less with respect to the whole inorganic filler layer.

2. The non-aqueous electrolyte secondary battery according to claim 1, wherein the inorganic filler is at least one type of metal oxide selected from the group consisting of alumina, magnesia and zirconia.

3. The non-aqueous electrolyte secondary battery according to claim 1, wherein
the positive electrode has, as a positive electrode active material, a lithium-transition metal composite oxide containing at least one type of metallic element selected from the group consisting of nickel, cobalt and manganese.

4. The non-aqueous electrolyte secondary battery according to claim 3, wherein the lithium-transition metal composite oxide is a lithium-nickel-cobalt-manganese composite oxide.

5. The non-aqueous electrolyte secondary battery according to claim 1, wherein
the positive electrode is a positive electrode sheet having a positive electrode mixture layer on a long sheet-like positive electrode current collector,
the negative electrode is a negative electrode sheet having a negative electrode mixture layer on a long sheet-like negative electrode current collector,
the separator is a long sheet-like separator, and
the non-aqueous electrolyte secondary battery has a wound electrode body constructed by winding the positive electrode sheet and the negative electrode sheet in a longitudinal direction via the separator.

6. A vehicle provided with non-aqueous electrolyte secondary battery according to claim 1.

7. The non-aqueous electrolyte secondary battery according to claim 1, wherein
the porous polyethylene layer has a porosity of 45% to 55%, and
the porous polymer layer has a porosity of 40% to 50%.

* * * * *